May 12, 1936. K. D. CHAMBERS 2,040,685
METHOD AND MEANS FOR X-RAY DIFFERENTIATION
BETWEEN SUBSTANCES IN POLY-COLOR
Filed Oct. 18, 1928

INVENTOR
Karl D. Chambers
BY Prindle, Wright, Neal & Bean
ATTORNEYS

Patented May 12, 1936

2,040,685

UNITED STATES PATENT OFFICE 2,040,685

METHOD AND MEANS FOR X-RAY DIFFERENTIATION BETWEEN SUBSTANCES IN POLY-COLOR

Karl D. Chambers, Montgomery, Ala.

Application October 18, 1928, Serial No. 313,339

23 Claims. (Cl. 250—34)

This invention comprises a method and means for obtaining images or photographic records of animate or inanimate objects which will show a differentiation between the chemicals of which the object consists or between physical properties inherent or existing in the parts, or between other properties of parts, so long as these properties affect differently the passage of two or more bands of electro-magnetic waves, which differences would not be brought out so clearly or noticeably or perhaps not at all by present methods and means.

The method consists of making two or more images or two or more photographic records of the object to be studied by means of two or more bands of transmitted electro-magnetic rays of two or more different wave-lengths or other properties and of combining these two or more images or two or more photographic records in various ways to produce one image or to produce one photograph, negative, positive, print, transparency, or some other more or less permanent record which is produced by so combining the two or more original photographic records as to bring out the relative difference in transmission.

As I shall show later several of the final combined images or photographic records may be in themselves combined to form further products.

For instance, if X-rays are used, a photograph composite of two or more photographs of two pieces of metal, one aluminum .215 cm. thick and one silver .011 cm. thick will show in colors if so manipulated, the silver in one color and the aluminum in another color. Further if X-rays are used a composite photograph through a hand will show in different colors the various substances of which the hand is composed and will show by very critical technique a color differentiation between some normal and pathological conditions.

In order to obtain these results, use is made of the fact that the ratio between the absorptive powers of two substances usually varies with the wave-lengths of the electro-magnetic rays used.

My method comprises, for instance, making two or more X-ray photographs of the subject with different bands of X-rays and utilizing one or more of the well known "additive" or "subtractive" color photographic processes to bring out the color differentiations by combining the negatives so originally obtained.

To the accomplishment of the foregoing and such other objects as may hereinafter appear, this invention consists in the construction, combination and arrangement of parts and the method hereinafter described and then sought to be defined in the appended claims, reference being had to the accompanying drawing forming a part hereof and which shows, merely for the purpose of illustrative disclosure, a preferred embodiment of my invention, it being expressly understood, however, that various changes may be made in practice within the scope of the claims without digressing from my inventive idea.

In the drawing:—

Figure 1:
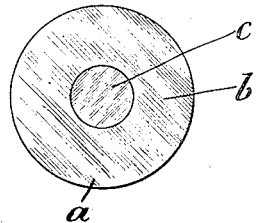
Figure 1 is a disc of silver around a disc of aluminum.
Figure 2:
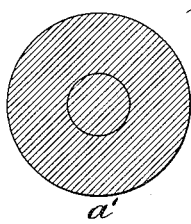
Figure 2 shows two X-ray negatives of the disc shown in Figure 1.

A specific example will make this clear. Two pieces of metal will be used for the sake of simplicity although the method and means used apply equally to animate objects. The object to be photographed ($a$, Fig. 1) is a silver disc ($b$) 3 cm. in diamater, .011 cm. thick and has a circular hole in it 1 cm. in diameter concentric with the disc. In this hole is a disc of aluminum ($c$) 1 cm. in diameter and .215 cm. thick which disc just fills laterally the hole in the silver disc. If now this object is photographed by a beam of X-rays consisting predominantly of rays of wave-length .08 Angstrom units, incident normally to the surface of the discs, the resulting negative ($a'$, Fig. 2) will show the same density of deposited silver over the image areas of both the silver and the aluminum discs. Each of them in this case transmits about 92.5 per cent. of the incident rays. If now this object is photographed again by a beam of X-rays consisting predominantly of rays of a wave length of .4 Angstrom units, incident normally to the surface of the discs, the silver disc will now transmit only about 1.5 per cent. of the incident rays while the aluminum disc will transmit about 52.6 per cent. of the incident rays. Consequently in the resulting negative ($b$ Fig. 2) made by the X-rays of predominantly .4 Angstrom units (which will be abbreviated hereinafter, A. U.) the image ($c$) of the silver disc will be much less dense than the image (d) of the aluminum disc.

Figure 3:
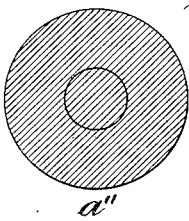
Figure 3 shows two positives made from the two negatives shown in Figure 2.

Now as aluminum is generally more transparent to the long wave lengths than silver is, I arbitrarily so decide to conventionalize the color process as to make the aluminum image show up in a predominant hue of the visible spectrum which is further toward the long wave-length end of the visible spectrum. I therefore, make a positive (a", Fig. 3) of the negative (a', Fig. 2) which was made by the .08 A. U. wave-length X-rays and in red;—that is, the positive as a whole is prepared in such a way (many are known to the art of color photography) that the dense portions absorb most of the waves of wave length greater than 5552 A. U. which lie within the visible spectrum while transmitting most of the waves of a lesser wave length which lie within the visible spectrum. I also make a positive (b", Fig. 3) of the negative (b', Fig. 2) and finish it in blue-green that is complementary to the red used in finishing the other positive. I now superimpose the two positives. Looking at them by diffused light passing through both of them, the image area of the aluminum disc looks much redder than neutral and the image area of the silver disc has a distinct predominant hue in the short wave-length end of the visible spectrum and looks green or blue-green depending upon the relative exposures and treatment. These two colored positives so combined and mounted comprise a poly-color transparency. In place of making these color image positives, plain monochromatic positives can be made and the two projected upon a screen one with red and one with blue green light. When the two images are superimposed, the color differentiation will be brought out just the same as by the first process described. Mean relative densities will be preserved by these methods so that the denser portions of an object photographed will show up darker than less dense portions.

By "mean relative densities" is meant the mean of the ordinary ratio between the densities of two substances. That is at some wave-lengths a certain piece of silver is more transparent than a certain piece of aluminum but in considering several bands of wave-lengths, silver is generally more dense than aluminum, and consequently has a higher mean relative density than aluminum has. The three color process can be used in this system so that all the colors of the visible spectrum may possibly be used. To do this three negatives are made, each with a particular band of X-rays, and the three resulting negatives are used as the three original negatives are used in regular three color work to combine the three primary sensation colors to produce the various colors of the entire range of visible colors. It has been found that some elements have very irregular absorption curves when the absorption is plotted against the wave-lengths of the X-rays. Use of this fact can be made to distinguish between elements that might otherwise be difficult of differentiation. This can be done by selecting such wave-length bands to photograph with as will bring out the greatest differences in absorption. The said absorption curves have abrupt changes due to the phenomena connected with "K" and "L" series of secondary radiation and they are known as "K" and "L" "discontinuities". The said absorption curve will be smooth for a considerable distance and then make a sharp drop or rise, the change of direction constituting a "discontinuity" after which the curve will again begin and continue smoothly until it comes to another discontinuity. Thus, for a very small change in wave length, a violent change in absorption is effected. The elements to be chosen for the screens and the wave lengths to be used can be determined by the absorption curves of the various elements with respect to X-rays, which curves are available in the literature; for instance, the International Critical Tables, published 1929 by Maple Press Co., York, Pa., vol. VI, page 23, under the heading "Emission of X-rays, Wave-lengths and Data on Absorption Limits" by D. L. Webster, W. W. Nicholas and Manne Siegbahn. On page 38 of this article tables are given for various elements.

For instance in the above example I chose X-rays of a wave-length of .08 A. U. for the first negative. At this wave-length and for the thickness of aluminum .215 cm. and of silver of .011 cm. the transmission through each of them was the same, 92.5 per cent. I chose to make my second negative, X-rays of wave-length .4 A. U. At this wave-length and with the same thickness of metals, the silver transmitted only 1.5 per cent. of the rays while aluminum transmitted 52.6 per cent. of them. Had I chosen X-rays of wave-length .6 A. U. for the second negative, the silver would still have transmitted 1.03 per cent. of the rays, while the aluminum transmission percentage would have dropped to 8.65. This would have still been a ratio of 1 to 8.4 but at a very low transmission for both, while with X-rays of .4 A. U. I got a ratio of 1 to 35 with relatively high transmission. These abrupt absorption changes as before stated are due to the phenomena connected with the "K" and "L" series of secondary radiation.

Figure 4:
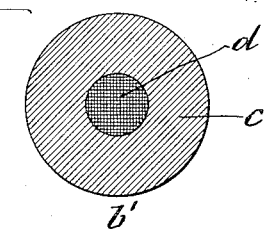
Figure 4 shows the relative positions of two centers of X-ray radiation ($d$ and $f$), a photographic plate ($e$), and the object to be photographed ($a$).
Figure 4:
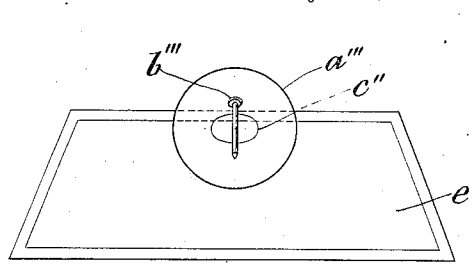

By a particular application of my invention stereoscopic effects may be obtained which will have color differentiation. To do this, two X-ray negatives are made of the object which for illustration I have selected as consisting of a wooden sphere (a''', Fig. 4) in which is an aluminum nail (b'''), in a vertical position, which passes through a thin, silver disc (c'''); the first X-ray picture is made with the center of X-ray radiation (d) at a point above the object and of course so located that the image of the object will fall on the sensitive photographic plate (e) and this first exposure is made with a certain band of X-rays having a predominant wave-length of .08 A. U. Then this exposed plate, plate 1, is removed and another sensitive plate is put in the same position which the first one occupied and another exposure is made with the object unmoved and with the center of X-ray radiation in the same position as before, but this time X-rays of predominantly .4 A. U. are used to make the exposure. Now plate 2 on which the second exposure was made is replaced by a third sensitive plate, plate 3. Plate 3 is exposed with the object in the same position but this exposure is made with the center of X-ray radiation shifted to a position (f) about four inches to one side of the first position (d) but equally distant perpendicularly from the position of the sensitive plates which remains the same for all four exposures. This third exposure is made with the same band of X-rays as was used to make plate 1. Plate three is now removed and plate 4 put in its place, and without changing the positions of the tube, plate, or object plate 4 is exposed.

This time however, the band of X-rays is used which was used to make plate 2.

Now plates 1 and 2 are used as described before as the basis from which to make one poly-color transparency; and plates 3 and 4 are likewise used to make the second poly-color transparency. These two poly-color transparencies are then used in the usual manner to obtain a steroscopic image, which will on account of the treatment just described show a poly-color as well as a three dimentional image in which the nail and the silver disc will appear in different colors. This treatment may be varied in many ways to produce many different results. For instance many different bands of X-rays may be employed; the relative positions of the plates, the object, and the X-ray radiation centers may be varied; and this is very important, only one broad band of X-rays may be used to make two negatives and the different relative absorption powers of different chemicals to different bands of rays may be brought out by putting a selective ray filter of some kind between two sensitive plates and an exposure made. If then the two resulting negatives are used as described above to form the basis of practicing my invention the results of color differentiation may be achieved. In other words these two negatives may be used to make a poly-color transparency.

Other rays than X-rays may be used for practicing my invention by selecting suitable sensitive materials and coloring media. A differentiation in non-opaque materials due to various optical phenomena, such as polarization, rotation, rotatory dispersion, differential absorption, etc., may be utilized to produce both mono-chromatic and poly-chromatic differentiation by the application of the principle of combining two images or negatives to form one when the two original images were made for the purpose of bringing out some varying relative absorption, or blocking, or lessening of the passing, of certain bands of electro-magnetic waves. For instance by photographing through an analyzer with a beam of mono-chromatic plane polarized light a block of irregularly shaped glass which has been immersed in a transparent liquid having the same index of refraction as the glass and having the liquid contained in a container which is transparent and which has optically plain and parallel opposite sides, a negative may be made. Now by photographing this same block of glass again but this time using a different wave-length of mono-chromatic plane polarized light a second negative may be obtained. Of course both negatives are made with the object and the different instruments in the same positions. Now if these two resulting negatives are used as the basis for making a poly-color transparency, any strains in the glass block due to imperfect annealing may be shown in color. By standardizing this process, definite quantitative results may be obtained. The color differentiation may be made immediately visible without photography in this way:

A Coolidge X-ray tube is used and is operated at two different voltages alternately. A 200,000 volt potential is applied for one twentieth of a second followed by a voltage of fifty thousand volts for one twentieth of a second. These voltages are applied at the contact points ($a$ and $b$, Fig. 5) which are both connected to the anode of the Coolidge X-ray tube ($c$, Fig. 5). The other connection on the other side of the tube remains fixed. A half disc of aluminum ($d$) is rotated in synchronism with these voltage changes so that while the higher voltage is acting in the tube this aluminum disc ($d$) 1.5 cm. thick will be across the path of the rays. This disc will screen out most of the longer wave-length X-rays and will permit only the short wave-length X-ray to pass. The rays pass through the object to be studied ($e$) and fall on a fluorescent screen ($f$). Another revolving disc ($g$) is situated between the eye of the observer ($h$) and the fluorescent screen ($f$). Half of this disc is a thin red light filter ($i$) and the other half ($j$) is a complementary blue-green light filter. The two discs and the fluctuations of the voltage are synchronized so that the eye looks through the red disc at the fluorescent screen while the lower voltage is on and consequently sees the image in red of the object as shown by the longer wave-lengths. The next twentieth of a second the short wave-lengths only are passing through the object, for the higher voltage is now on and the longer wave lengths are filtered out by the aluminum half disc which has now rotated into position on its center ($k$) and also the green half disc ($j$) of the light filter ($g$) has now come between the eye of the observer ($h$) and the fluorescent screen ($f$) and he now sees the image of the object in blue-green as shown by the very short wave-length X-rays. As the alterations are very rapid they are above the critical flicker period of the eye and the observer sees what appears to be a stationary image in color. The frequency of the rotation of the whole system can be speeded up somewhat if flicker still appears. This period varies with observers. The fluorescent materials of the screen must be made of substances or a substance which when excited by X-rays emit light in both the red and the blue-green portions of the visible spectrum.

Figure 5:
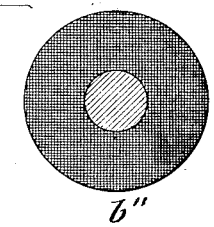
Figure 5 shows the relative positions of an X-ray tube ($c$), a revolving disc ($d$), the object to be directly observed ($e$), a fluorescent screen ($f$), another revolving disc ($g$) and the observer ($h$).
Figure 5:
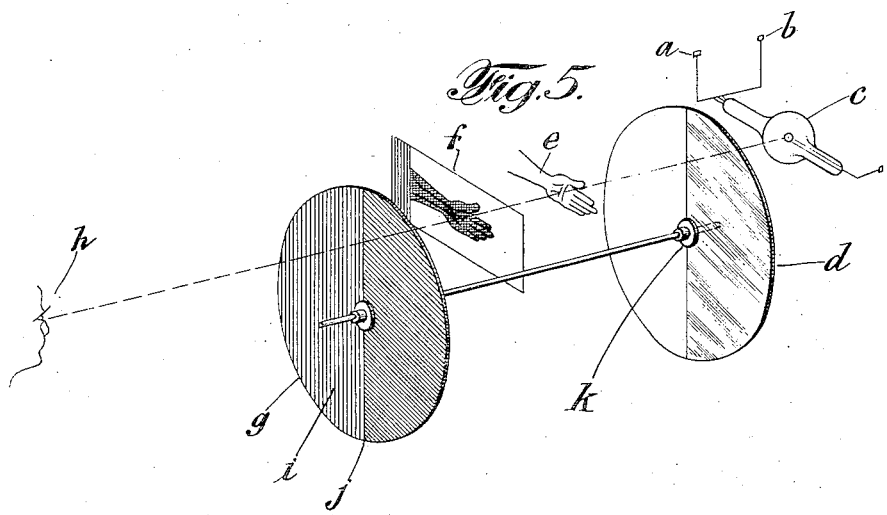

In Figure 5 I have shown the relative positions of the different parts somewhat exaggerated. In actual practice most of the parts would be closer together, and means would be employed to shield the eye from visible light not coming from the fluorescent screen. Also a thick plate of lead glass would be employed to shield the eye from X-rays, possibly by placing it between the fluorescent screen ($f$) and the rotating disc ($g$). This would be transparent to the visible light from the fluorescent screen ($f$) but opaque to the X-rays. I wish to state that the two or more negatives resulting from exposure to different bands of X-rays may be used to produce color prints, by any of the well known poly-color processes of half-tone plates, lithographic plates, rotogravure plates, etc. They may also be used as the basis for producing poly-color carbon or other pigment printing. A technique for general practice can be developed in this field and most probably will consist of three standard bands of X-rays at specified voltages and intensities and with standard exposure for similar subjects, and will be made on standard emulsion plates. The development will be carefully controlled, as will the chemicals, temperature, etc. The making of the color plates will be equally controlled. The dyes used should be standardized and controlled by the processes used by the Massachusetts Institute of Technology or the Eastman Kodak Company Research Laboratories. If these standardizations are used, a color identification will become peculiarly associated with certain pathological or chemical conditions and soon the result will be that a new instrument of research and investigation will take its place among the others. While I have described in this application methods of making polychromatic stereoscopic images of an object, I have made no claims herein which are specific to methods of or apparatus for producing said images but have made such claims in my companion application, Serial No. 313,340, filed simultaneously with the present application.

If two exactly similar discs of silver, each with a triangle of aluminum in it, both metals of exactly known dimensions are placed one on each side of the subject being photographed, a guide for superimposing and for color matching will be furnished very simply.

"Grids", "shields" and other appliances known to the art and constantly used can be used as usual for the purposes that they serve. They have been purposely omitted from the above description for the sake of simplicity.

In the claims I use the word "body" to include a mass in solid, liquid or gaseous phase or combinations of these phases as my invention is applicable to the study of all of these.

I claim:

1. A method of making visible optical differentiation between the chemical constituents of a body, by exposing said body to bands of X-rays which said constituents absorb, in varying proportions transforming said X-rays into light rays, of a different color for each of said bands, and super-imposing images formed by each of said bands.

2. A method of making visible optical differentiation between the chemical constituents of a body, by exposing said body to bands of X-rays, which said constituents absorb in varying proportions transforming said X-rays into light rays, of a different color for each of said bands, and super-imposing images formed by each of said bands, each of said images being formed of a different color.

3. A method of making visible in colors, differentiation between the chemical constituents of a body, which comprises passing beams of X-rays of differing predominant wave length through said body, forming therewith separate images on photographic plates and forming an apparently composite visible image by passing a different color of light through each of said plates.

4. The method of making visible, differentiation between the chemical constituents of a body comprising exposing said body to bands of X-rays lying on opposite sides of a discontinuity of a curve of the absorption of said rays for a desired constituent or constituents and transforming the X-ray images into visible images.

5. The method of making visible, differentiation between the chemical constituents of a body comprising exposing said body to bands of X-rays lying on opposite sides of discontinuity of a curve of the absorption of said rays for a desired constituent or constituents and transforming the X-ray images thus formed into visible images.

6. The method of making visible, differentiation between the chemical constituents of a body comprising exposing said body to bands of X-rays lying on opposite sides of discontinuity of a curve of the absorption of said rays for a desired constituent or constituents and transforming the X-ray images thus formed into visible images and separately coloring the images formed by each of said bands.

7. A method of making visible optical differentiation between the chemical constituents of a body, by exposing said body to different bands of X-rays, and forming separate images by each of said bands and forming a composite of the images thereby formed.

8. A means for making visible, color differentiation between the chemical constituents of an object, comprising a source of two or more different bands of X-rays, means for changing from one band of X-rays to another, a fluorescent screen, a plurality of different visible light filters, one for each of said bands of X-rays, and means for so operating said filters in synchronism with the changes in the bands of X-rays, as to enable an observer to view the images formed on the screen alternately through two or more of said different visible light filters.

9. A method of making color differentiation between the chemical constituents of a body, which comprises passing beams of electro magnetic waves, of predominantly different wave lengths through the body to be studied, alternately permitting said beams to illuminate a fluorescent screen, and simultaneously interposing between an observer and said screen, different visible light filters in synchronism with the changes in the bands of waves used.

10. Means for making visible, color differentiation between the chemical constituents of a body, comprising a source of two or more different bands of X-rays, a screen for making visible the images thus formed, a plurality of different colored light filters, one for each of said bands of X-rays, and means for so operating said filters in synchronism with changes in the bands of X-rays, as to enable an observer to view the images formed on the screen alternately through two or more of said different colored light filters.

11. Means for making visible, color differentiation between the chemical constituents of a body, comprising a source of two or more different bands of X-rays, a screen for making visible the images thus formed, a plurality of different colored light filters, one for each of said bands of X-rays, and means for so operating said filters in synchronism with changes in the bands of X-rays, as to enable an observer to view the images formed on the screen alternately through two or more of said different colored light filters.

12. Means for making visible, differentiation between constituents of a body, comprising means for projecting two or more different bands of X-rays, a fluorescent screen, means for enabling an observer to view the images formed on said screen alternately through two or more filters in synchronism with the changes of bands of X-rays used.

13. The method of making an X-ray picture of an object in color, comprising forming a plurality of images by means of bands of X-rays having substantially different predominant wave lengths, and forming respectively differently colored images from each of said images in blended relation.

14. The method of making an X-ray picture of an object in color comprising forming a plurality of images by means of bands of X-rays having substantially different predominant wave lengths, and obtaining respectively differently colored images from each of said images in blended relation, the colors of longer wave lengths being used with the images made by X-rays of longer wave lengths.

15. Means for making visible, differentiation between constituents of a body, comprising means for projecting two or more bands of X-rays, of different predominant wave length, a fluorescent screen, means for enabling an observer to view the images formed on said screen alternately through two or more filters.

16. Means for making visible, differentiation between constituents of a body, comprising means for projecting two or more bands of X-rays of different predominant wave length, a fluorescent screen, means for enabling an observer to view the images formed on said screen alternately through two or more color filters.

17. Means for making visible, differentiation between constituents of a body comprising means for projecting two or more bands of X-rays of different predominant wave length, a fluorescent screen, means for enabling an observer to view the images formed on said screen alternately through two or more color filters.

18. The method of making an X-ray image of the presence, and/or density of a particular chemical element existing in an object and having a discontinuity in its absorption curve for X-rays, comprising making a plurality of images respectively by bands of X-rays each lying near to, but on opposite sides of such discontinuity.

19. The method of making an X-ray image of the presence, and/or density of a particular chemical element existing in an object and having a discontinuity in its absorption curve for X-rays, comprising making a plurality of images respectively by bands of X-rays each lying near to, but on opposite sides of such discontinuity, coloring said images by different colors and combining the images thus formed.

20. The method of making an X-ray picture of an object in color, comprising forming a plurality of images by means of bands of X-rays having substantially different predominant wave lengths, causing said images respectively to be colored, differently, and combining said colored images in blended relations.

21. The method of making an X-ray picture of an object in color, comprising forming a plurality of images by means of bands of X-rays having substantially different predominant wave lengths, causing said images respectively to be colored, differently, and combining said colored images in blended relations, the colors of longer wave lengths being used with the images made by X-rays of longer wave lengths.

22. The method of making an X-ray picture of an object in color, comprising forming a plurality of images by means of bands of X-rays of substantially different predominant wave lengths, and forming respectively different colored images from each of said images, and bringing said images into blended relation.

23. The method of making an X-ray picture of an object in color, comprising forming a plurality of images by means of bands of X-rays for substantially different predominant wave lengths, and forming respectively different colored images from each of said aforesaid images and in blended relation, the colors of longer wave lengths being used with the images of longer wave lengths.

KARL D. CHAMBERS.